United States Patent
Frank et al.

(10) Patent No.: US 9,902,243 B1
(45) Date of Patent: Feb. 27, 2018

(54) MOONROOF RING

(71) Applicant: Ford Global Technologies, LLC, Dearborn, MI (US)

(72) Inventors: Steven Frank, Dearborn, MI (US); Jamie March, Wyandotte, MI (US); Bhadresh V. Vyas, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/245,314

(22) Filed: Aug. 24, 2016

(51) Int. Cl.
 *B60J 7/043* (2006.01)
 *B23K 26/21* (2014.01)
 *B23K 26/323* (2014.01)
 *B23K 103/18* (2006.01)

(52) U.S. Cl.
 CPC .............. *B60J 7/043* (2013.01); *B23K 26/21* (2015.10); *B23K 26/323* (2015.10); *B23K 2203/18* (2013.01)

(58) Field of Classification Search
 CPC ........ B60J 7/043; B23K 26/21; B23K 26/323; B23K 2203/18
 See application file for complete search history.

(56) References Cited

U.S. PATENT DOCUMENTS

| | | | |
|---|---|---|---|
| 7,677,652 B2 | 3/2010 | Mollick et al. | |
| 7,914,072 B2 | 3/2011 | Queener et al. | |
| 7,938,482 B1 * | 5/2011 | Ludwig | B60J 7/0573 296/216.07 |
| 9,308,577 B2 | 4/2016 | Schurter et al. | |
| 2010/0231007 A1 | 9/2010 | Freeman et al. | |
| 2014/0191536 A1 | 7/2014 | Elfwing et al. | |

FOREIGN PATENT DOCUMENTS

DE  10152951 A1 * 5/2002 ............. B60J 10/82

\* cited by examiner

*Primary Examiner* — Lori L Lyjak
(74) *Attorney, Agent, or Firm* — Jason Rogers; Brooks Kushman, P.C.

(57) ABSTRACT

A moonroof ring assembly may include a first portion being formed from a first material, and a second portion being laser welded to the first portion and being formed from a second material, wherein the first material is of a higher strength than the second material.

20 Claims, 1 Drawing Sheet

MOONROOF RING

TECHNICAL FIELD

The present disclosure relates to moonroof rings.

BACKGROUND

Vehicles often include moonroofs and sunroofs. Customers often desire an open feeling and the size of moonroofs has been increasing. The desire for an 'open air' feel may lead to the lack of a B pillar bow. However, vehicles must still adhere to certain strength requirements and moonroof assemblies must make up for the lack of support caused by the missing B pillar bow.

SUMMARY

A moonroof ring assembly may include a first portion being formed from a first material, and a second portion being laser welded to the first portion and being formed from a second material, wherein the first material is of a higher strength than the second material.

A moonroof ring assembly may include a first portion including a first, second and third sub-portion, each sub-portion being formed from a first material, and a second portion being laser welded to the first portion at the second sub-portion and the third sub-portion, the second portion being formed from a second material, wherein the first material is of a higher strength than the second material.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In order for moonroofs to have an "open air" feel for the customer, B-pillar bows may be eliminated from vehicle designs. However, vehicles must still meet various requirements including safety and crash test metrics. To accommodate for the lack of B-pillar bows and to maintain structural reinforcement in the roof structure to meet stiffness and stability requirements, moonroof rings may be added to the body structure to maintain a moonroof module in place. Because the moonroof module may include heavy components such as motors, moonroof housings, glass, etc., the moonroof ring may be manufactured to handle these heavy loads.

Moonroof rings are often formed of sheet metal. The moonroof rings may be stamped from a single sheet of metal. Other moonroof rings may be made out of boron, including hot-stamped boron. However, boron is often expensive, and without efficient use of the material, the cost to manufacture a boron moonroof ring may exceed budget constraints.

Disclosed herein is a moonroof ring assembly including a laser welded hot stamped boron blank to improve material utilization and increase material use efficiencies. By implementing a boron laser welded blank, the moonroof ring may appreciate better nests for the blanks of the moonroof ring. Further, lower grade boron may be used, decreasing costs. In one example, a high-grade of boron may be required for the rearward joint. However, the forward material can be a lower grade of boron. In another example, four laser welded blanks may be achieved, one at each corner of the moonroof ring. In this example, the moonroof ring may enjoy high material utilization and lower costs.

Figure 1:
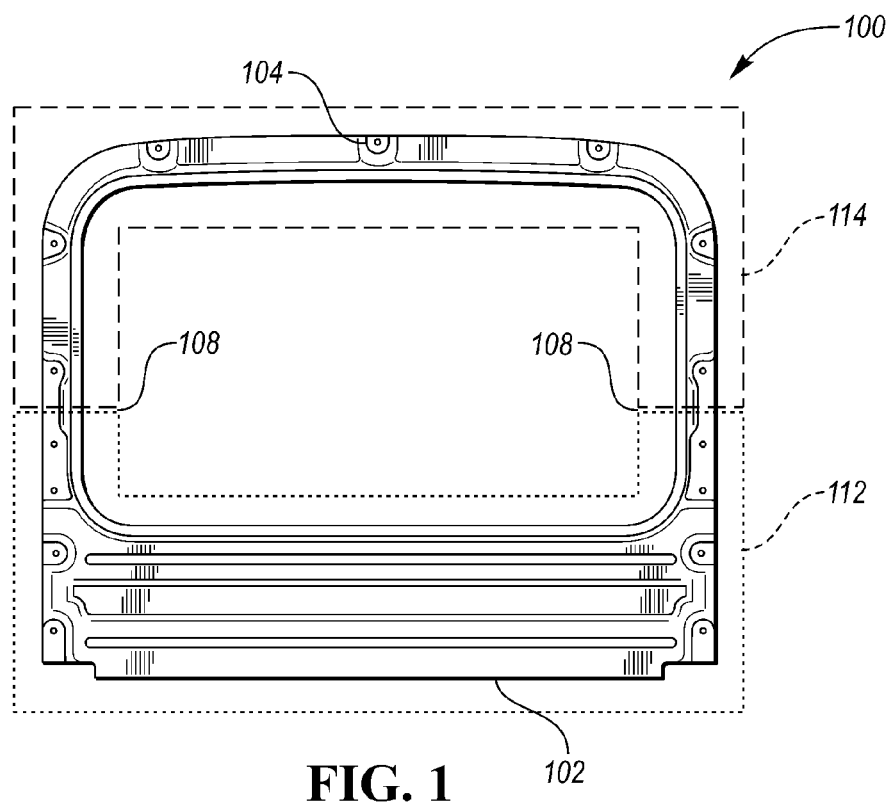
FIG. 1 illustrates an example moonroof ring.

FIG. 1 illustrates an example moonroof ring assembly 100. The moonroof ring assembly 100 may be configured to be arranged within a roof body of a vehicle to maintain a moonroof module therein. The moonroof module may include various components such as motors, glass, frames, joints, bearings, etc. The moonroof module may be connected to the moonroof ring assembly 100 via various fasteners, adhesives, etc.

The moonroof ring assembly 100 may me made out of one or more pieces of hot stamped-boron. In the example in FIG. 1, the moonroof ring assembly 100 may include a first portion 102 and a second portion 104. The first portion 102 may be arranged at a rearward portion of the roof while the second portion 104 may be arranged at a forward portion of the roof. The first portion 102 may carry a strength requirement necessary to meet or exceed side and roof crush requirements. The forward portion, or second portion 104, may have a lower strength requirement than the rearward portion, or first portion 102.

The first portion 102 may be made of a first material. The second portion 104 may be made of a second material and may be made of a lower strength material than the first material. In one example, both the first material and the second material may be boron. The first portion 102, however, may be made of a higher strength boron than the second portion 104. In one example, the first portion 102 may be made of boron 1100 MPa (megapascal) while the second portion 104 may be made of boron 500 MPa. Thus, the second portion 104 may be made using less expensive and lower weight material than the first portion 102. By using two materials, one with a lesser weight and cost, overall weight and costs may be reduced.

The first portion 102 and the second portion 104 may be attached to one another at a pair of seams 108. The seams 108 may be sealed or connected via laser welded blanks. Laser welded blanks may be used to seal the two materials together so that they form the single piece moonroof ring assembly 100. The first material may have a first thickness greater than a second thickness of the second material. The laser welded blanks may facilitate and accommodate any difference in thickness between the first portion 102 and the second portion 104. Further, using laser welding may eliminate any overlapping joints at the seams 108, as well as reduce the costs and the need for dies, presses, etc. Manufacturing may be less complicated and time consuming due to the need for fewer production steps, as well as the short cycle times and reduced thermal effects on the materials.

During manufacturing, the first portion 102 may be stamped, or cut, from a first material piece 112. The second portion 104 may be stamped, or cut, from a second material piece 114. By stamping each portion from a separate material piece, the amount of materials wasted during manufacturing is decreased at least because the size of discarded material is decreased.

Figure 2:
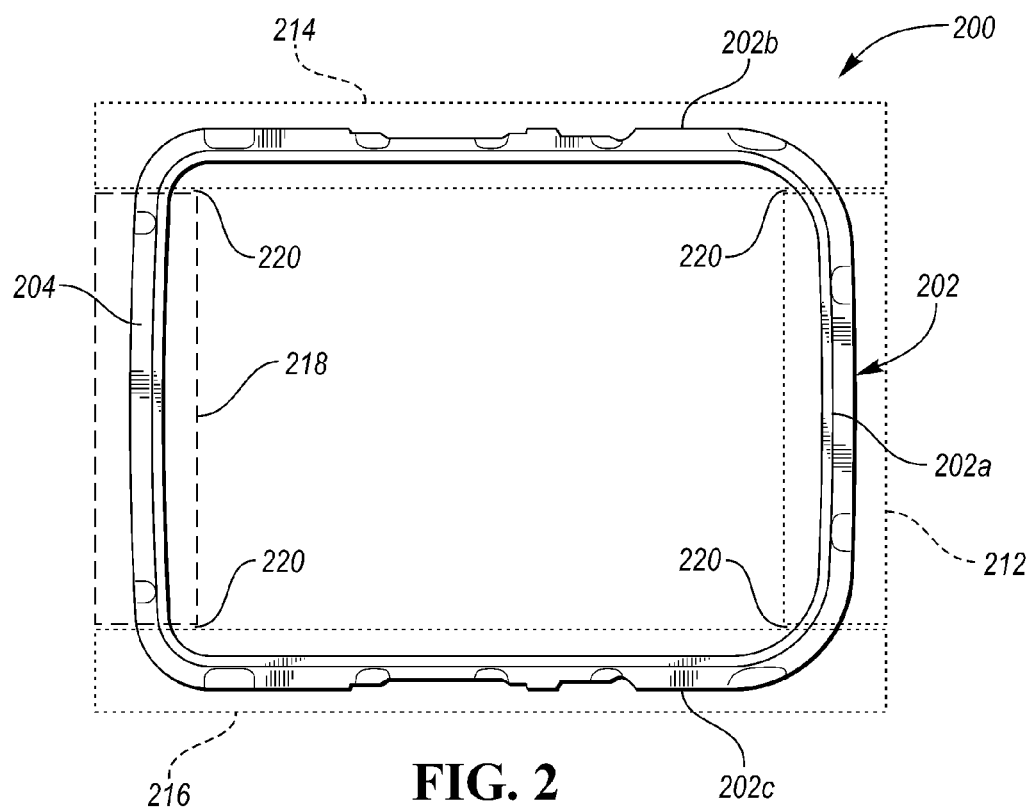
FIG. 2 illustrates another example moonroof ring.

FIG. 2 illustrates another example moonroof ring assembly 200. In the example in FIG. 2, the moonroof ring assembly 200 may include a first portion 202 and a second portion 204. The first portion 202 may include a plurality of sub-portions such as a first sub-portion 202a, a second sub-portion 202b, and a third sub-portion 202c. The sub-portions 202a-c may form a U-shape and may be arranged where the second portion 204 is connected to the first portion 202 at the second and third sub-portions 202b, 202c. The first sub-portion 202a may be arranged at a rearward portion of the roof while the second portion 204 may be arranged at a forward portion of the roof.

The first portion 202 may carry a strength requirement necessary to meet or exceed side and roof crush requirements, including the first, second and third sub-portions 202a-c. The forward portion, or second portion 204, may have a lower strength requirement than the rearward and side portions including the first sub-portion 202a, second sub-portion 202b, and third sub-portion 202c.

Similar to the moonroof ring assembly 100 of FIG. 1, the first portion 202 may be made of a first material. The second portion 204 may be made of a second material and may be made of a lower strength than the first material. Both the first material and the second material may be boron. The first portion 102, however, may be made of higher strength boron than the second portion 104. In one example, the first portion 202 may be made of boron 1100 MPa (megapascal) while the second portion 204 may be made of boron 500 MPa. Thus, the second portion 204 may be made using less expensive and lower weight material than the other portions, including sub-portions 202a-b. By using two materials, one with a lesser weight and cost, overall weight and costs may be reduced.

The moonroof ring assembly 200 of FIG. 2 may be formed by attaching the second portion 204 and the sub-portions 202a-b to one another at a plurality of seams 220. The seams 220 may be sealed or connected via laser welded blanks. Laser welded blanks may be used to seal the portions 202a-b, 204 together so that they form the single piece moonroof ring assembly 200. The laser welded blanks may make up for any difference in thickness between the second portion 204 and the second and third sub-portions 202b, 202c.

During manufacturing, the first sub-portion 202a may be stamped, or cut, from a first material piece 212. The second sub-portion 202b may be stamped, or cut, from a second material piece 214. The third sub-portion 202c may be formed from a third material piece 216, and the second portion 204 may be formed from a fourth material piece 218. In the example shown in FIG. 2, each of the material pieces 212, 214, 216, 218 may be of a rectangular shape. By stamping or cutting the portions 202a-c, 204 from rectangular pieces, the amount of scrap material may be decreased.

Vehicles may include more than one moonroof and therefore more than one moonroof ring assembly 100, 200 may be included in the vehicle. Further, the moonroof ring assembly 100, 200 may be implemented in other vehicle parts such as rear windshields, other vehicle windows, etc.

Accordingly, described herein is a moonroof ring assembly including two portions of boron, each at different ratings. Lower grade boron may be used for one of the portions, decreasing costs. In one example, a high-grade of boron may be required for the rearward portion while the forward portion can be formed from a lower grade of boron. In another example, four laser welded blanks may be achieved, one at each corner of the moonroof ring assembly. In this example, the moonroof ring may enjoy high material utilization and lower costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A moonroof ring assembly, comprising:
a moonroof ring including a rear portion and a forward portion, the rear portion being formed from a first material and the forward portion having a laser welded connection to the rear portion and being formed from a second material, wherein the first material is of a higher strength than the second material.

2. The assembly of claim 1, wherein at least one of the first material and the second material is boron.

3. The assembly of claim 1, wherein the first material is a first boron material and the second material is a second boron material, the second boron material having a higher strength than the first boron material.

4. The assembly of claim 1, wherein the rear portion has a first thickness greater than a second thickness of the forward portion and wherein the laser welded connection of the rear portion to the forward portion accommodates for the difference in thickness between the first material and the second material.

5. The assembly of claim 1, wherein the rear portion is formed from a first material piece and the forward portion is formed from a second material piece.

6. The assembly of claim 1, wherein the rear portion forms a U-shape.

7. The assembly of claim 6, wherein the U-shape is formed by a first, second and third sub-portions each arranged to form the U-shape.

8. The assembly of claim 7, wherein the sub-portions are each formed from a separate material piece and laser welded together to from the U-shape.

9. A moonroof ring assembly, comprising:
a first portion including a first, second and third sub-portion, each sub-portion being formed from a first material; and
a second portion being laser welded to the first portion at the second sub-portion and the third sub-portion, the second portion being formed from a second material, wherein the first material is of a higher strength than the second material.

10. The assembly of claim 9, wherein at least one of the first material and the second material is boron.

11. The assembly of claim 9, wherein the first material is a first boron material and the second material is a second boron material, the second boron material having a higher strength than the first boron material.

12. The assembly of claim 9, wherein the first portion has a first thickness greater than a second thickness of the second portion and wherein the laser welding the first portion to the second portion accommodates for the difference in thickness between the first material and the second material.

13. The assembly of claim 9, wherein the first portion is formed from a first material piece and the second portion is formed from a second material piece.

14. The assembly of claim 9, wherein the sub-portions of the first portion form a U-shape.

15. The assembly of claim 14, wherein the sub-portions are each formed from a separate material piece and laser welded together to from the U-shape.

16. A method for assembling a moonroof ring assembly, comprising:
   forming a rear portion from a first material;
   forming a forward portion from a second material, wherein the first material is of a higher strength than the second material; and
   laser welding the forward portion to the rear portion.

17. The method of claim 16, wherein the first material is a first boron material and the second material is a second boron material, the second boron material having a higher strength than the first boron material.

18. The method of claim 16, wherein the rear portion has a first thickness greater than a second thickness of the forward portion and wherein the laser welding of the rear portion to the forward portion accommodates for the difference in thickness between the first material and the second material.

19. The method of claim 16, wherein the rear portion is formed from a first material piece and the forward portion is formed from a second material piece.

20. The method of claim 16, wherein at least one of the rear portion and the first portion are U-shaped.

* * * * *